US009022658B2

(12) United States Patent
Buguin et al.

(10) Patent No.: US 9,022,658 B2
(45) Date of Patent: May 5, 2015

(54) JOURNAL BEARING PAD FOR TURBINE

(71) Applicant: ALSTOM Technology Ltd, CH-5400 Baden (CH)

(72) Inventors: Arnaud Buguin, Gentilly (FR); Jacques Mizera, Pierrefonds (FR)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/904,164

(22) Filed: May 29, 2013

(65) Prior Publication Data

US 2013/0336605 A1 Dec. 19, 2013

(30) Foreign Application Priority Data

Jun. 1, 2012 (EP) .................................. 12290181

(51) Int. Cl.
| F16C 17/03 | (2006.01) |
| F16C 32/06 | (2006.01) |
| F16C 23/02 | (2006.01) |
| F01D 25/16 | (2006.01) |

(52) U.S. Cl.
CPC .......... *F01D 25/166* (2013.01); *F16C 32/0666* (2013.01); *F16C 17/03* (2013.01)

(58) Field of Classification Search
CPC .... F16C 17/03; F16C 17/035; F16C 32/0666; F01D 25/166
USPC .................. 384/100, 117, 122, 306–312, 316
See application file for complete search history.

(56) References Cited

U.S. PATENT DOCUMENTS

| 2,480,114 | A | | 8/1949 | Bradbury |
| 3,004,804 | A | * | 10/1961 | Pinkus et al. ................. 384/311 |
| 3,589,782 | A | | 6/1971 | Breton et al. |
| 3,791,703 | A | | 2/1974 | Ifield |
| 4,497,587 | A | | 2/1985 | Pine |
| 4,568,204 | A | * | 2/1986 | Chambers ..................... 384/152 |
| 5,518,321 | A | * | 5/1996 | Hata ............................. 384/311 |
| 5,743,654 | A | * | 4/1998 | Ide et al. ....................... 384/100 |
| 5,743,657 | A | * | 4/1998 | O'Reilly et al. .............. 384/312 |
| 6,000,851 | A | * | 12/1999 | Cohen et al. .................. 384/252 |
| 6,623,164 | B1 | * | 9/2003 | Gozdawa ...................... 384/117 |
| 2008/0013872 | A1 | * | 1/2008 | Geiger ........................... 384/309 |

FOREIGN PATENT DOCUMENTS

| CN | 1349057 A | 5/2002 |
| DE | 3587837 T2 | 11/1994 |

(Continued)

OTHER PUBLICATIONS

European Search Report of the European Patent Office for Application 12290181.2 dated Nov. 7, 2012, 8 pages.

(Continued)

*Primary Examiner* — Marcus Charles

(57) ABSTRACT

A hydrodynamic journal pad bearing is provided having several pads circumferentially distributed around the rotor of a large steam turbine with each pad mounted onto a platform separating the pad from a cylindrical cage in turn connected to the floor of a hall housing the turbine and having an interface between at least one of the several pads and the platform on which the at least one of the several pads is mounted is formed such as to include at least two areas with different curvatures to increase the stiffness of the interface in the event of a relative movement between the pad and the platform.

17 Claims, 4 Drawing Sheets

(56) References Cited

FOREIGN PATENT DOCUMENTS

| | | | | |
|---|---|---|---|---|
| EP | 0789151 A1 | * | 8/1997 | |
| EP | 2345820 A1 | * | 7/2011 | |
| EP | 2339192 B1 | * | 6/2013 | F16C 17/03 |
| GB | 883820 A | * | 11/1961 | F16C 23/04 |
| GB | 1529142 A | * | 10/1978 | |
| JP | 56010817 | | 2/1981 | |
| JP | 57029811 A | * | 2/1982 | F16C 17/03 |
| JP | 2009257349 | | 11/2009 | |
| KR | 100764635 B1 | * | 10/2007 | |
| KR | 200439056 Y1 | * | 3/2008 | |
| KR | 100942190 B1 | * | 2/2010 | |
| WO | WO 9845608 A1 | * | 10/1998 | F16C 17/03 |
| WO | 0011360 A1 | | 3/2000 | |

OTHER PUBLICATIONS

Office action issued from Chinese Patent Office dated Oct. 8, 2014 for CN Application No. 201310214802.8.

* cited by examiner

JOURNAL BEARING PAD FOR TURBINE

The present invention relates to hydrodynamic bearings, in particular for heavy rotors in power plants.

BACKGROUND

In hydrodynamic bearings, a rotating object such as a shaft is supported by a stationary bearing pad via a pressurized fluid such as oil, air or water. Hydrodynamic bearings take advantage of the fact that when the rotating object moves, it does not slide along the top of the fluid. Instead the fluid in contact with the rotating object adheres tightly to the rotating object, and motion is accompanied by slip or shear between the fluid particles through the entire height of the fluid film.

Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is deflected at a small angle to the rotating member, the fluid will be drawn into the wedge-shaped opening, and sufficient pressure will be generated in the fluid film to support the load. This fact is utilized in thrust bearings for hydraulic turbines and propeller shafts of ships as well as in the conventional hydrodynamic journal bearing.

Both thrust bearings and radial or journal bearings normally are characterized by shaft supporting pads spaced about an axis. The axis about which the pads are spaced generally corresponds to the longitudinal axis of the shaft to be supported for both thrust and journal bearings. This axis may be termed the major axis.

In a large steam turbine, several stages of blades are mounted on the steam turbine shaft and axially spaced-apart along the shaft to form a complete rotor. Each set of blades or airfoils, or each turbine stage, changes the enthalpy of the steam passing axially through the turbine which causes the rotor to rotate. The force of the steam admitted into the turbine affects the rotor. As is well known in the art, the direction and magnitude of this force is influenced by the particular control mode of operation for the turbine, i.e., full arc steam admission mode or partial arc mode. Hence, although the rotor primarily rotates about its axis, the turbine shaft also experiences both horizontal and vertical movements due to these forces.

Commonly a plurality of bearings are located at various axial locations along the shaft. Some bearings of a steam turbine include several pads which space the rotatable shaft away from the bearing casing. These bearings are normally lubricated with oil and some of this oil is distributed between each pad face and the shaft's surface. In operation, the oil in the interstice between the pad face and the shaft surface hydrodynamically lifts the shaft off the face of the pad. The amount of lift developed in the bearing determines the stiffness of the bearing to horizontal and vertical forces acting upon the shaft. In this manner, the bearing dampens the horizontal and/or vertical movements of the shaft, as well as, rotatably supports the shaft without placing large frictional forces thereon which inhibit the rotation of the shaft. The frictional forces inherent within the bearing, and hence power losses, are minimized by the oil film in the interstice defined by the rotating shaft surface and the face of the pad. Additionally, the oil film cools the pad face, which is heated by friction, thereby protecting the integrity of the bearing.

Due to the great weight of the turbine carried by the shaft in combination with the speed of rotation of the shaft, a bearing which loses this oil film in one or all of its interstices deteriorates rapidly because the shaft surface wipes the pad face and, consequently, the shaft and/or the pad face may be scored. The resulting inefficiency of a wiped bearing is well known in the art. Additionally, when the shaft surface does come in wiping contact with the pad face, great frictional forces are generated by that contact which affects the immediate performance of the steam turbine.

Since horizontal and vertical damping of the turbine shaft motion is an important function of the bearing, three pad bearings have been developed. The three pad bearing lessens the total amount of pad face area which interacts with the shaft surface, thereby lowering the total viscous shear of the oil, and hence, lowering the total frictional forces and power losses developed within the bearing. However, the minimization of the shaft surface/pad face interface introduces arcuate spaces between each pad, i.e., the space defined by the trailing edge of the preceding pad, the leading edge of the next or succeeding pad, the shaft surface and the radially inner surface of the bearing casing.

Since the lubricating oil cools the pad face, as well as provides support for the shaft, a continuous stream of oil normally flows through the interstice between each pad face and the adjacent shaft surface. The oil is ejected proximate the trailing edge of each pad. The ejected oil churns within the arcuate space and such churning is believed to cause some power loss in the bearing.

Such bearings are described for example in the U.S. Pat. No. 4,497,587.

In modern steam turbines the load of the rotor can exceed 200 tons. In spite of the great load the bearing are typically manufactured to very small tolerances.

It can be seen as an object of the present invention to change the stiffness of the bearing and hence increase the rigidity of the bearing and its support structure.

SUMMARY

According to an aspect of the present invention, there is provided a hydrodynamic journal pad bearing having several pads circumferentially distributed around the rotor of a large steam turbine with each pad mounted onto a platform separating the pad from a cylindrical cage in turn connected to the floor of a hall housing the turbine, wherein at an interface between at least one of the several pads and the platform on which the at least one of the several pads is mounted is formed such as to include at least two areas with different curvatures to increase the stiffness of the interface in the event of a relative movement between the pad and the platform.

In a first variant of the invention at least one of the several pads has at the contact area between the pad and the platform a first radius of curvature at the center of the contact area and a second radius of curvature outside the center of the contact area with the first radius being five to ten times larger than the second radius of curvature. By making the bottom of the pad slightly flatter the stiffness of the bearing in its supports is increased.

In the second variant the pad has only one radius of curvature in the area of contact while the curvature of contact area of the supporting pad is changed from being flat to slightly curved. Both variants can also be combined.

The bearing is designed to allow a tilting of the pads in circumferential direction to compensate for a corresponding delineation of the rotor within the bearing.

In a preferred embodiment the at least one of the several pads include one major or load bearing pad located in operation at the bottom of the cage and having a significantly larger width in circumferential direction than the other pads.

In a variant of the preferred embodiment the platform supporting the load bearing pad extends in axial direction between 124/305 to 230+/305 of the axial length of the pad itself. This large contact area reduces the load of the pad and rotor onto the platform and can therefore avoid deformation of the shape of the contact area. The practical result is that the contact area maintains its shape within the desired tolerances for longer.

The effective axial extension which actually supports the weight can be made larger by reducing the size of the central bore through the platform. In a preferred variant the central bore has within the platform a smaller diameter than in the cage and/or in the pad itself.

In a further preferred embodiment the pad is fixed to the cage by two removable locking bolts which are located in bores located at juxtaposed sides of the central axial plane of the platform and extending preferably in a direction parallel to the tilting axis of the pad without being exactly on it or close to it.

The overall dimensions of the device are suitable for carrying rotor loads of more than 100 tons and at rotation speeds of 10 Hz or more.

The above and further aspects of the invention will be apparent from the following detailed description and drawings as listed below.

BRIEF DESCRIPTION OF THE DRAWINGS

Exemplary embodiments of the invention will now be described, with reference to the accompanying drawings, in which.

DETAILED DESCRIPTION

Aspects and details of examples of the present invention are described in further details in the following description.

Figure 1:
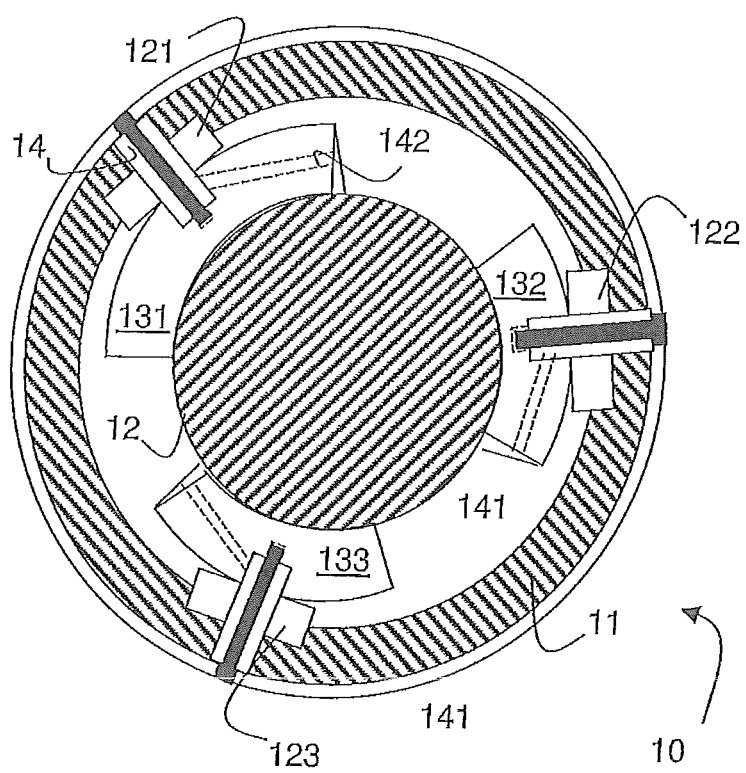
FIG. 1 is a schematic circumferential cross-section of a hydrodynamic journal pad bearing in accordance with an example of the invention.

In FIG. 1 there is shown a schematic circumferential cross-section of a hydrodynamic journal pad bearing 10 in accordance with an example of the invention. It includes a ring-shaped cylindrical frame or cage 11 which is ultimately connected to the static part of a large steam turbine. Within the cage are the platforms 121, 122, 123. Mounted onto each of the platforms 121, 122, 123 is a corresponding bearing pad 131, 132, 133. The central space of the bearing is taken by the rotor 12.

While sharing most of the constituent components, each pad differs from the others to match better the load and forces at their respective location. Among the features common to all pads is a central bore 14 which connects a circumferential oil distribution groove 141 to a channel 142 within the pads leading to small chamber at the end of the pad. The small chamber has a opening to the surface of the rotor and distributes a film of oil onto the rotor. Among the pads, a particular role is played by the bottom platform 121 and the pad 131 mounted onto it. It is wider than the other two pads as it is designed to carry most of the weight of the rotor 12.

Each platform and pad and their connection is designed to provide a limited degree of freedom to allow for tilting around a tilting axis which is parallel to the central axis of the bearing. During the tilting the pad essentially rolls on the surface of its platform. In the following figures this aspect of the bearing is shown in greater details.

Figure 2:
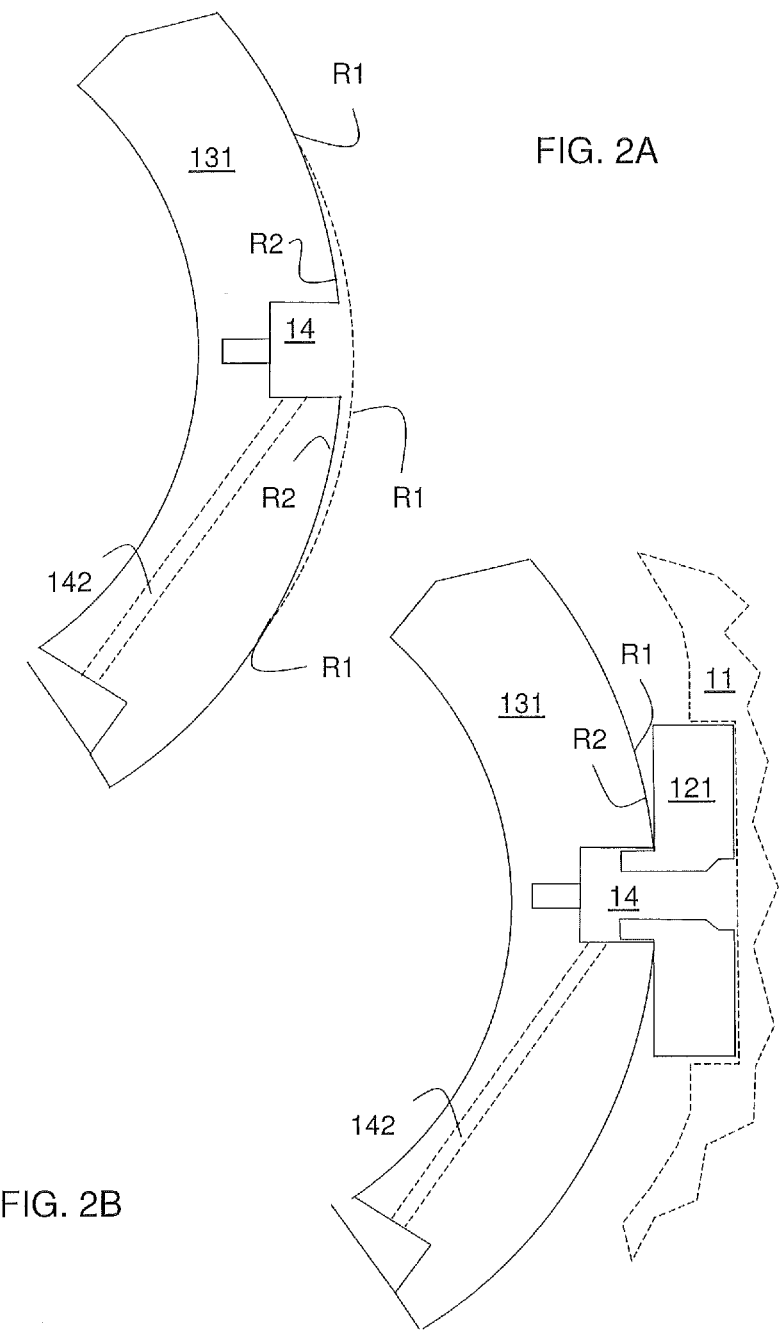
FIG. 2A,B show an enlarged view of a bearing pad in accordance with an example of the invention.

As shown in FIG. 2A, 2B the pad 131 has a central opening 14 just sufficiently large to glide over a short matching annular protrusion 124 on the platform 121 with small intentional clearances to accommodate an equally small amount of tilting movement of the pad 131. The outer surface with respect to the central axis of the bearing of the pad 131 is machined at the contact area with the platform into a cylindrical shape with a radius of curvature R1. However towards the center of the contact area this radius R1 is increased locally to R2 such that the pad becomes slightly flatter in the corresponding part of the contact area. The dashed line in FIG. 2A shows the curvature without change. The radius of curvature R2 is about 7 times larger than R1.

The local curvature of the outer surface of the pad could be decreased to about 5 times the radius of the pad or increased to about 10 times the radius of the pad. It is however regarded as advantageous to maintain this radius below infinity corresponding to a flat surface. The ratio of the two radii can be used to adjust a desired amount of stiffness or resistance to tilting of the bearing pad.

Figure 3:
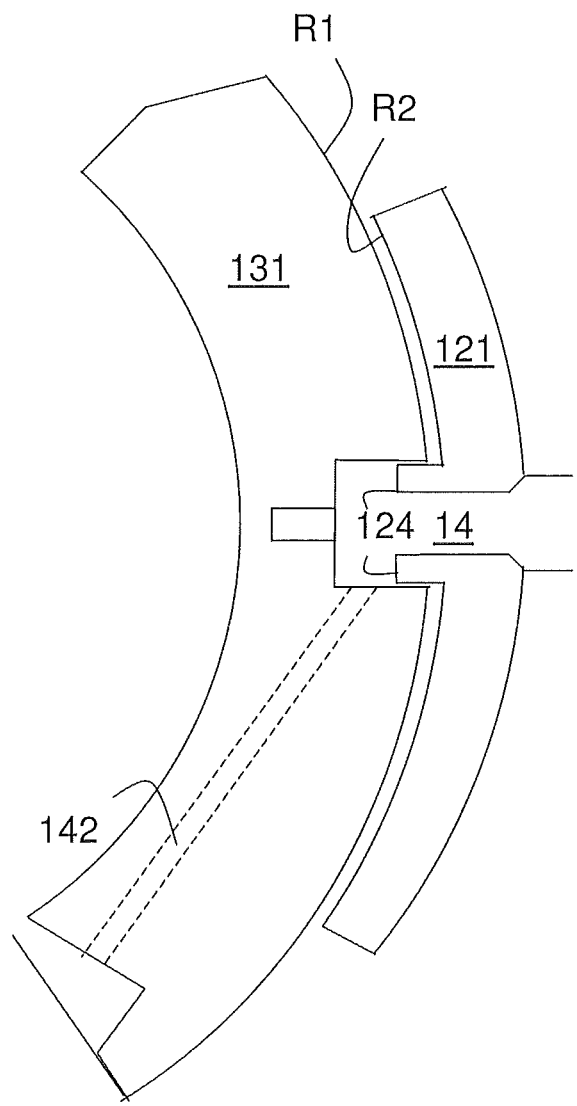
FIG. 3 shows an enlarged view of a bearing pad with a curved support platform in accordance with another example of the invention.

In the example of FIG. 3 the opposing face of the platform 121 starting from the outer diameter of the stub 124 is no longer flat as in the example of FIG. 2A,B but machined into a similar cylindrical surface with a radius of curvature R2. The pad 131 has in this example a uniform radius of curvature R1. Again the ratio of the two radii R1, R2 can be used to adjust a desired amount of stiffness or resistance to tilting of the bearing pad.

To maintain this desired amount of stiffness or resistance throughout the life of the bearing it is seen as important to prevent deformation of the shape of the contact area due to excessive loads. To reduce the load the platform supporting the load bearing pad extends in axial direction between 124/305 to 230+/305 of the axial length of the pad itself. By extending the axial width the platform to the maximal range, i.e. to between 200/305 to 250/305, the load can be effectively minimized. The practical result is that the contact area maintains its shape within the desired tolerances for longer and even under heavy loads.

The same effect of a larger contact area can be achieved by reducing the size of the central bore 14 through the platform 121. The central bore 14 narrows from the outer side or distribution ring 141 of the platform to the inner surface where pad 121 and platform 131 are in contact. This narrowing with respect to the outer channel of the oil supply increases the platform area towards its center and helps to reduce potential deformation. However, if desired the area gained by reducing the diameter of the oil supply channel through the platform can also be used to increase the thickness of the stub.

Figure 4A:
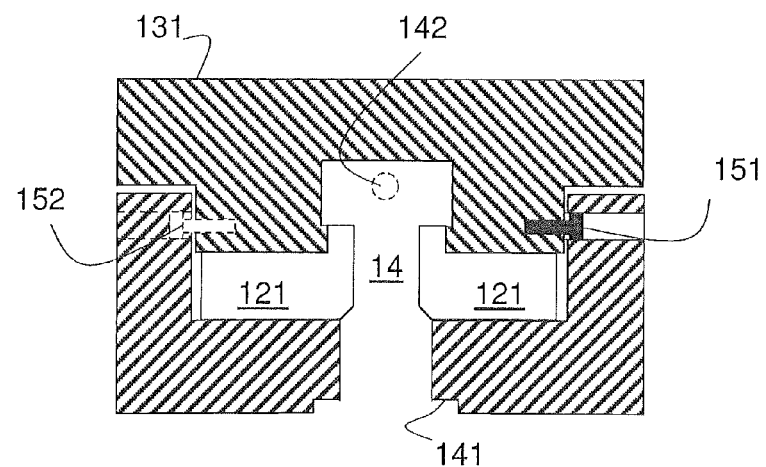
FIG. 4A,B are cross-sections of a part of FIG. 1 in axial and circumferential directions, respectively.
Figure 4B:
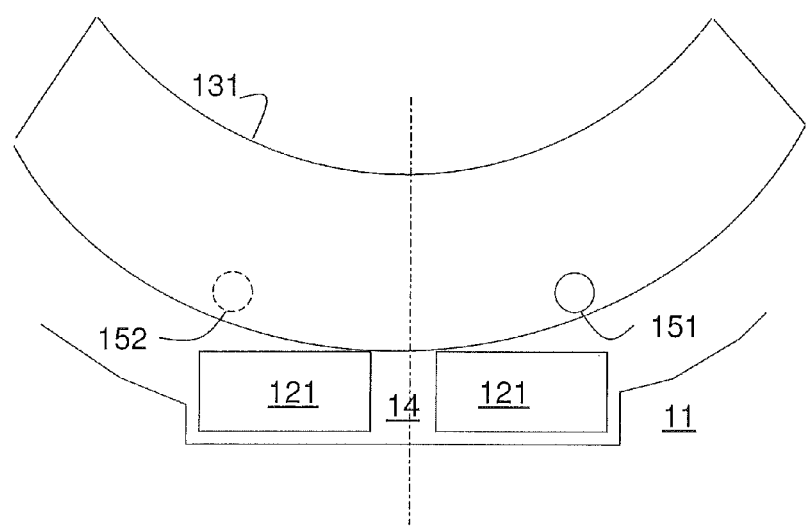

In FIG. 4A,B there are further shown two screws 151, 152 inserted into the pad through channels or bores in the rim section of the cage. The screws prevent radial movement of the pad 131 and secure the pad during assembly or maintenance of the bearing. The axial cross-section of FIG. 4A cuts through the first screw 151 while FIG. 4B is a circumferential cross-section.

The screws 151, 152 are located at juxtaposed sides of the central axial plane of the platform 121 and extend in a direction parallel to the tilting axis of the pad 131 without being exactly on it or close to it. As shown in FIG. 4B, the screws are moved away from the center of the contact area.

The overall effect of the above described modifications of known journal pad bearings for steam turbine is a mechanical stiffening of the bearing. This stiffening effect can be applied to compensate for more flexibility in other parts of a pedestals supporting the steam turbine rotors. This is advantageous for example in large steam turbines having their inner casing mounted not directly onto foundation pillars but onto a plate supporting both inner casing and the bearing. Such designs as for example described in the European patent application no. EP11193149 filed on 13 Dec. 2012 are inherently more flexible at the location of the bearing and the flexibility can be compensated by a properly designed bearing following the aspects of the present inventions.

The present invention has been described above purely by way of example, and modifications can be made within the scope of the invention, particularly as relating to the shape and design of the pad and the platform. The invention also consists in any individual features described or implicit herein or shown or implicit in the drawings or any combination of any such features or any generalization of any such features or combination, which extends to equivalents thereof. Thus, the breadth and scope of the present invention should not be limited by any of the above-described exemplary embodiments.

Each feature disclosed in the specification, including the drawings, may be replaced by alternative features serving the same, equivalent or similar purposes, unless expressly stated otherwise.

Unless explicitly stated herein, any discussion of the prior art throughout the specification is not an admission that such prior art is widely known or forms part of the common general knowledge in the field.

The invention claimed is:

1. A hydrodynamic bearing comprising: several pads circumferentially distributed around a rotor of a steam turbine with each pad mounted onto a platform separating the pad from a cylindrical cage, wherein an outer surface of at least one of the several pads is formed with at least two areas of differing curvatures to increase stiffness of the outer surface for movement between the pad and the platform, wherein at least one of the several pads has, at a contact area between the pad and the platform, a first radius of curvature outside a center of the contact area and a second radius of curvature at the center of the contact area, and with the second radius of curvature being five to ten times larger than the first radius of curvature.

2. The journal pad bearing of claim 1 wherein at least one of the several pads has at a contact area between the pad and the platform a first radius of curvature and the platform is at the contact area curved with a radius of curvature larger than the first radius.

3. The journal pad bearing of claim 2 wherein the platform supporting the load bearing pad extends in axial direction between 124/305 to 250/305 of the axial length of the pad.

4. The journal pad bearing of claim 2 wherein the central bore has within the platform a smaller diameter than in the cage area and/or in the pad itself.

5. The journal pad bearing of claim 2 wherein the pad is fixed to the cage by two removable locking bolts or screws located in bores at juxtaposed sides of the central axial plane of the platform.

6. The bearing of claim 1, wherein the at least one of the several pads include one major or load bearing pad located in operation at a bottom of the cage and having a significantly larger width in a circumferential direction than other pads.

7. The bearing of claim 6 wherein the platform supporting the one major or load bearing pad extends in an axial direction between 124/305 to 250/305 of the axial length of the pad.

8. The bearing of claim 6, further comprising a central bore having a smaller diameter within the platform than in the cylindrical cage and/or in the pad.

9. The bearing of claim 1, wherein the platform supporting the one major or load bearing pad extends in an axial direction between 124/305 to 250/305 of the axial length of the pad.

10. The bearing of claim 9, further comprising a central bore having a smaller diameter within the platform than in the cylindrical cage and/or in the pad.

11. The bearing of claim 1, further comprising a central bore having a smaller diameter within the platform than in the cylindrical cage and/or in the pad.

12. The journal pad bearing of claim 1 wherein the pad is fixed to the cage by two removable locking bolts or screws located in bores at juxtaposed sides of the central axial plane of the platform.

13. The journal pad bearing of any of claim 1 wherein the pad is fixed to the cage by two removable locking bolts or screws located in bores at juxtaposed sides of the central axial plane of the platform and extending in a direction parallel to the tilting axis of the pad without being exactly on the tilting axis or close to the tilting axis.

14. The bearing of claim 1, designed to carry in its center a rotor with a weight exceeding 50 tons.

15. The bearing of claim 1, wherein the bearing is a part of a steam turbine for use in a power generation plant to generate electrical power.

16. The bearing of claim 15, further comprising a load bearing plate shared between the bearing and an inner casing of the steam turbine and the load bearing plate is supported such that a movement of the load bearing plate results in an equal movement of the cylindrical cage and the inner casing.

17. The journal pad bearing of claim 1 wherein the pad is fixed to the cage by two removable locking bolts or screws located in bores at juxtaposed sides of the central axial plane of the platform.

* * * * *